Figure 2:
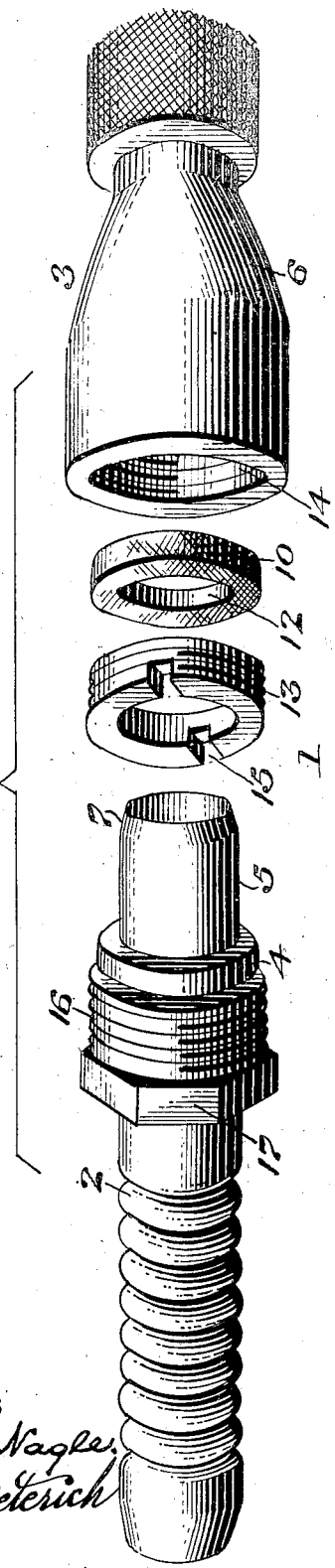

M. C. HUTCHINSON.
HOSE COUPLING.
APPLICATION FILED FEB. 8, 1913.

1,083,742.

Patented Jan. 6, 1914.

WITNESSES
P. F. Nagle.
H. T. Dieterich

INVENTOR
Morton C. Hutchinson.
BY
Niedersheim Fairbanks
ATTORNEYS

UNITED STATES PATENT OFFICE.

MORTON C. HUTCHINSON, OF WOODBURY, NEW JERSEY.

HOSE-COUPLING.

1,083,742.  Specification of Letters Patent.  Patented Jan. 6, 1914.

Application filed February 8, 1913. Serial No. 746,990.

*To all whom it may concern:*

Be it known that I, MORTON C. HUTCHINSON, a citizen of the United States, residing at Woodbury, Gloucester county, State of New Jersey, have invented a new and useful Hose-Coupling, of which the following is a specification.

My invention relates to a novel construction of a hose coupling adapted to be located in hose, pipes or conduits for conveying fluids, such as air, water or other liquids, and consists of a novel construction of simple and reliable coupling members and their adjuncts which can be readily assembled or disconnected by unskilled labor and wherein any increase of pressure will cause the joint between the coupling sections to be tighter or more effective, so that the greater the pressure within the pipe or coupling sections the tighter and more effective will be the joint between the same.

My invention is especially adapted for use in connection with hydraulic or pneumatic machinery wherein a hose is employed to convey pressure to these or similar devices, wherein, as is well known, such hose is liable to be subjected when in use to heavy, intermittent strains when the fluid pressure is turned on or cut off to operate the mechanism of such tools. These wide variations of fluid pressure are liable to exert a powerful longitudinal strain on the coupling members of the hose as heretofore constructed, thereby tending to damage the same and cause leakage at the couplings or at the points where the same are packed, and to the above ends my invention consists in a novel construction and location of a packing washer common to the male and female sections of the coupling in conjunction with a novel retaining ring for said packing and a novel construction of male member and retaining nut therefor, whereby as the pressure increases the better will be the joint between the coupling sections and in addition the same are free to be turned or rotated to the desired extent, whereby there will be no kinking of either of the hose sections employed.

To the above ends my invention consists of a novel construction of hose coupling, wherein the novel features will be hereinafter fully set forth and particularly pointed out in the claim.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1:
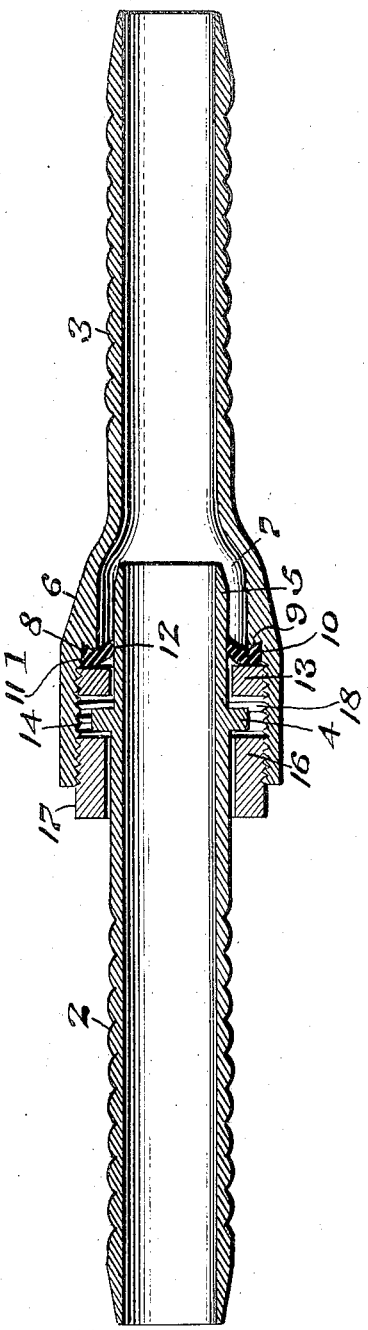

Figure 1 represents a longitudinal sectional view of a hose coupling embodying my invention. Fig. 2 represents a perspective view of the same, showing certain of the parts in separated position and illustrating also the manner of assembling the same.

Similar numerals of reference indicate corresponding parts in the figures.

Referring to the drawings, 1 designates my novel construction of a hose coupling the same comprising a male member 2 and a female member 3. The male member 2 is provided with an annular ring or flange 4 having the extension 5 projecting therefrom. The female member 3 is provided with the enlarged or bell-shaped member 6 having a chamber 7 adapted for the reception of the extension 5 of the male member. The chamber 7 is provided with a recess 8 which is preferably widest at its outer portion and is provided with the shoulder 9, which bites the contiguous portion of the packing or washer 10 which may be of rubber or other similar material and is preferably provided with the slightly enlarged or outer portion 11 seated in the pocket or recess 8 therefor and having the projecting portion or inner periphery 12 which is deflected slightly to the right when the parts are assembled, so that the inner periphery of said washer bears upon the extension 5 of the male member and as the pressure increases within the chamber 7 the tighter will be the joint formed between the washer and the contiguous portion of the extension 5 of the male member.

13 designates a retaining ring which is screw-threaded to engage the internally threaded portion 14 of the bell-shaped member 6 of the female member, said retaining ring being provided with notches 15 for the purpose of enabling it to be readily screwed against the washer 10.

16 designates a locking nut which is exteriorly threaded to engage the internal threads 14 of the female member, the outer portion of said nut 16 being provided with hexagonal or other polygonal faces 17 for the application of a wrench thereto, so as to enable said nut 16 to be readily screwed into or out of assembled position.

In practice there is a slight clearance between the retaining nut 16 and the flange 4 and there is also a clearance between said flange 4 and the juxtaposed surface of the locking ring 13, whereby an internal chamber 18 is formed within which said flange 4 has a limited amount of longitudinal and rotary movement.

The manner of assembling the parts and the operation thereof will now be apparent, the packing or washer 8 being first placed in position and the retaining ring 13 being next screwed into place against said washer whose outer periphery is held fixedly in position while its inner periphery has a slight freedom of movement with respect to the variations of pressure within the female coupling chamber 7. The male member 2 is then introduced into the female member so that the extension 5 occupies the chamber 7 whereupon the locking nut 16 is screwed into position, the parts now appearing substantially as seen in Fig. 1.

It will be apparent that when pressure is conveyed to or through the coupling or the hose members attached thereto the tendency of said pressure will be to cause the inner portion or periphery 12 of the washer 10 to tightly and frictionally engage the extension 5, so that as the pressure increases the better will be the joint between said washer and extension 5 of said male member. It will further be apparent that ample opportunity is provided for the male and female members to be rotated with respect to each other so that kinking of the hose is obviated and that there is a slight amount of longitudinal play permitted to the flange 4 so that there will be no liability of the coupling members sticking or binding with respect to each other.

It will be apparent that my invention is applicable to hose adapted for the conveyance of any fluid under pressure, such as air, water or other liquid and that the same can be very cheaply constructed as the parts can be assembled as they come from the foundry with a minimum of machine work thereon.

It will now be apparent that I have devised a novel and useful construction of a hose coupling which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages. It will further be apparent that in my invention I employ preferably a simple rubber washer of ordinary construction, which is not removable or disturbed by the separation of the male and female members, or in other words, by the uncoupling of the hose.

Having thus described my invention, what I claim as new and desire to secure by Letters Patent, is:—

In a hose coupling, a female member having a screw-threaded interior and a shoulder at the inner end of said threaded interior, a flexible washer adapted to bear against said shoulder, a threaded locking ring of greater internal diameter than that of said washer, engaging the threaded interior of said female member and adapted to clamp said washer against said shoulder, a male member having an extension of less diameter than the surrounding bore of said female member and adapted to project through said washer and formed with a flange thereon, and a locking nut having an external thread adapted to engage the internal thread of the female member to confine the flange of said male member.

M. C. HUTCHINSON.

Witnesses:
F. G. CONNELL,
J. T. WICKERSHAM.